United States Patent
Wang et al.

(10) Patent No.: US 7,416,761 B2
(45) Date of Patent: Aug. 26, 2008

(54) COMPOSITE MEMBRANE AND METHOD FOR FORMING THE SAME

(75) Inventors: Da-Ming Wang, Yangmei Township, Taoyuan County (TW); Kueir-Rarn Lee, Chung-Li (TW); Juin-Yih Lai, Taoyuan County (TW); Tien-Hsiang Hsueh, Taipei County (TW); Yung-Hsin Lee, Tainan County (TW); Chia-Hao Lo, Chiayi County (TW)

(73) Assignee: Chung Yuan Christian University, Taoyuan (TW)

( * ) Notice: Subject to any disclaimer, the term of this patent is extended or adjusted under 35 U.S.C. 154(b) by 0 days.

(21) Appl. No.: 11/435,718

(22) Filed: May 18, 2006

(65) Prior Publication Data

US 2006/0269735 A1    Nov. 30, 2006

(30) Foreign Application Priority Data

May 31, 2005    (TW) .............................. 94117896 A

(51) Int. Cl.
*B05D 3/02*    (2006.01)

(52) U.S. Cl. .................... 427/245; 427/243; 427/374.1; 427/374.5

(58) Field of Classification Search ............. 427/374.1, 427/243, 245, 374.5
See application file for complete search history.

(56) References Cited

U.S. PATENT DOCUMENTS

| | | | | |
|---|---|---|---|---|
| 4,247,259 A | * | 1/1981 | Saboe et al. | 416/241 B |
| 4,332,035 A | * | 6/1982 | Mano | 623/66.1 |
| 5,552,100 A | * | 9/1996 | Shannon et al. | 264/127 |
| 5,677,366 A | * | 10/1997 | Wu | 523/201 |
| 6,143,675 A | * | 11/2000 | McCollam et al. | 442/221 |

* cited by examiner

*Primary Examiner*—Kirsten C Jolley
(74) *Attorney, Agent, or Firm*—WPAT, P.C.; Justin King

(57) ABSTRACT

The present invention discloses discloses a composite PTFE membrane comprising an expanded PTFE membrane as substrate and a sintered porous PTFE membrane on top of it. The porous PTFE membrane on top has porous structure with interconnected channels formed with a sintering process that fuses the PTFE fine powders coated on the ePTFE membrane. Furthermore, the present invention discloses a method for forming the composite PTFE membrane.

16 Claims, 2 Drawing Sheets

COMPOSITE MEMBRANE AND METHOD FOR FORMING THE SAME

BACKGROUND OF THE INVENTION

1. Field of the Invention

The present invention is generally related to composite membranes, and more particularly to composite polytetrafluoroethylene membranes.

2. Description of the Prior Art

Polytetrafluoroethylene (PTFE) is a highly crystalline polymer containing two types of chemical bonds, C—C and C—F bonds. These two types of chemical bonds are strong, given the bond energy of the C—C bond about 290-335 kJ/mole and that of the C—F bond about 482 kJ/mole. Thus, PTFE has a very stable chemical property and an excellent electrical insulation property and has also low friction coefficients. In addition, PTFE can be used at 250° C. for a long period of time and is unaffected by solvent or chemical substance, when being operated below its melting point. PTFE has many applications, such as for electrical insulation, corrosion-resistance and abrasion resistance.

Due to difficulty in dissolving PTFE in common solvents, traditionally PTFE porous films have been made by extruding PTFE powders into paste rods, calendering the rods to form films, and stretching the films to make them porous. Such porous films are also called expanded polytetrafluoroethylene (ePTFE) membranes. However, the application of ePTFE membranes to membrane separation is limited to microfiltration, because the pores generated by stretching are usually larger than 0.1 μm and not uniform. To extend the application of PTFE membranes for separating particles smaller than 0.1 μm, such as ultrafiltration, new membrane fabrication process are still needed to manufacture PTFE membranes with smaller pores and more uniform size distribution.

SUMMARY OF THE INVENTION

In light of the above-mentioned matter, the present invention provides a new composite PTFE membrane and a method for forming the same to extend the application of PTFE membranes.

One object of the present invention is to coat a suspension solution of PTFE fine powders on an expanded PTFE membrane, to form porous structure with interconnected channels by a following sintering process that fuses the polytetrafluoroethylene (PTFE) particles. Another object is to perform the sintering process on one side of the ePTFE membrane together with a simultaneous cooling process on the other side, so as to prevent serious shrinking of the ePTFE membrane and to reduce the sintering time via elevating the sintering temperature. The other object is to tailor the gaps among the sintered particles by adjusting the quenching rate of the sintered composite PTFE membrane. With the present invention, composite PTFE membranes can be produced of which the pores are smaller than the ePTFE membranes manufactured by the traditional stretching method. Application of PTFE membranes can therefore be extended, indicating that the present invention has advantages over the traditional method.

According to the above-mentioned objectives, the present invention discloses a composite PTFE membrane comprising an expanded PTFE membrane as substrate and a sintered porous PTFE membrane on top of it. The porous PTFE membrane on top has porous structure with interconnected channels formed with a sintering process that fuses the PTFE fine powders coated on the ePTFE membrane. Furthermore, the present invention discloses a method for forming the composite PTFE membrane.

DESCRIPTION OF THE PREFERRED EMBODIMENTS

What is probed in the present invention is a composite PTFE membrane and a method for forming the same. Detail descriptions of the structure and elements will be provided in the following in order to make the invention thoroughly understood. Obviously, the application of the invention is not confined to specific details familiar to those who are skilled in the art. On the other hand, the common structures and elements that are known to everyone are not described in details to avoid unnecessary limits of the invention. Some preferred embodiments of the present invention will now be described in greater detail in the following. However, it should be recognized that the present invention can be practiced in a wide range of other embodiments besides those explicitly described, that is, this invention can also be applied extensively to other embodiments, and the scope of the present invention is expressly not limited except as specified in the accompanying claims.

Figure 1A:
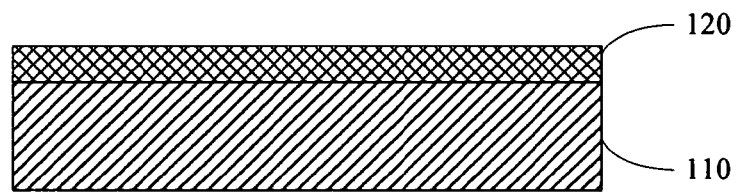
FIG. 1A shows the schematic structure of a composite PTFE membrane in the first embodiment of the present invention, comprising an expanded PTFE membrane and a sintered porous PTFE membrane attached thereto.

In the first embodiment of the present invention, as shown in FIG. 1A a composite PTFE membrane comprises an expanded PTFE (ePTFE) membrane 110 and a sintered porous PTFE membrane 120, wherein the pore diameter of the ePTFE membrane 110 is about 0.02~1 μm, the average pore diameter of that is about 0.2~0.8 μm, and the thickness of that is more than or equal to 10 μm. Moreover, the pore diameter of the porous PTFE membrane 120 is less than or equal to 0.5 μm and the average pore diameter of that is about 0.01~0.4 μm, which is formed on one surface of the ePTFE membrane 110 by a sintering process. Specifically, the porous PTFE membrane 120 has porous structure with interconnected channels formed by fusing the fine PTFE powders coated on the ePTFE membrane 110, with particle diameter of about 0.01~1 μm and average diameters of about 0.05~0.8 μm.

In this embodiment, the sintering temperature is about 330° C.~520° C. and the sintering time is less than or equal to 20 minutes. The sintering process can be performed by an infrared heater, such as an infrared gold image furnace, a contact heater, such as a Hot Press, or a gas-circulating heater, such as an oven. Moreover, during the sintering of the PTFE powders on one surface of the ePTFE membrane 110, a cooling process is simultaneously carried out on the other surface of the ePTFE membrane 110, the temperature of which is less than or equal to 50° C. There are two purposes of the cooling process: (1) reducing the temperature rising of the ePTFE membrane 110 during sintering to prevent serious shrinking of the ePTFE membrane 110; and, (2) increasing the applicable sintering temperature (The highest applicable temperature is 520° C.) in order to reduce the sintering time. Besides, in the invention the temperature refers to the temperature of the medium of the heating or cooling process. Additionally, the preferred media of said cooling process are liquid (e.g. water cooling system).

Figure 1B:
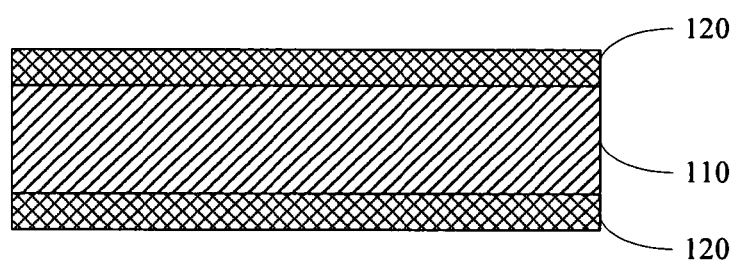
FIG. 1B shows the schematic structure of a composite PTFE membrane in the first embodiment of the present invention, comprising an expanded PTFE membrane and two sintered porous PTFE membranes attached thereto respectively.

As shown in FIG. 1B, the embodiment discloses another composite PTFE membrane comprising an expanded PTFE (ePTFE) membrane 110 and two sintered porous PTFE membranes 120 attached thereto respectively, wherein the two sintered porous PTFE membranes 120 are formed sequentially on the two surfaces of the ePTFE membrane 110 by two sintering processes. Moreover, while performing the sintering process on one surface of the ePTFE membrane 110, a cooling process on the other surface of the ePTFE membrane 110 is carried out at the same time. In addition, the ePTFE membrane 110, the two porous PTFE membranes 120, the sintering process, and the cooling process have the same selections and conditions as the above-mentioned according matter.

Figure 2:
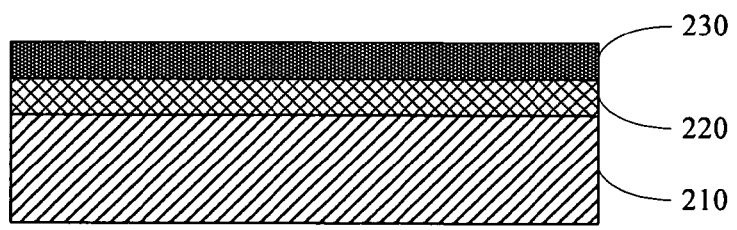
FIG. 2 shows the schematic structure of a composite PTFE membrane in the second embodiment of the present invention, comprising an expanded PTFE membrane, a sintered porous PTFE membrane, and a dense PTFE membrane.

Referring to FIG. 2, the second embodiment of the invention discloses a composite PTFE membrane comprising an ePTFE membrane 210, a sintered porous PTFE membrane 220 with a first surface and a second surface, and a dense PTFE membrane 230. The porous PTFE membrane 220 is formed on one surface of the ePTFE membrane 210 by a sintering process and the first surface of the sintered porous PTFE membrane 220 is in contact with the ePTFE membrane 210. The dense PTFE membrane 230 is formed on the second surface of the sintered porous PTFE membrane 220 by a sintering process with longer duration. The dense PTFE membrane 230 has dense and non-porous structure and the thickness of the dense PTFE membrane 230 is less than or equal to 10 μm. Moreover, the sintering process on one surface of the ePTFE membrane 210 is performed together with a simultaneous cooling process on the other surface of the ePTFE membrane 210. Besides, the ePTFE membrane 210, the sintered porous PTFE membrane 220, the sintering process, and the cooling process have the same selections and conditions as the according matter described in the first embodiment.

Figure 3:
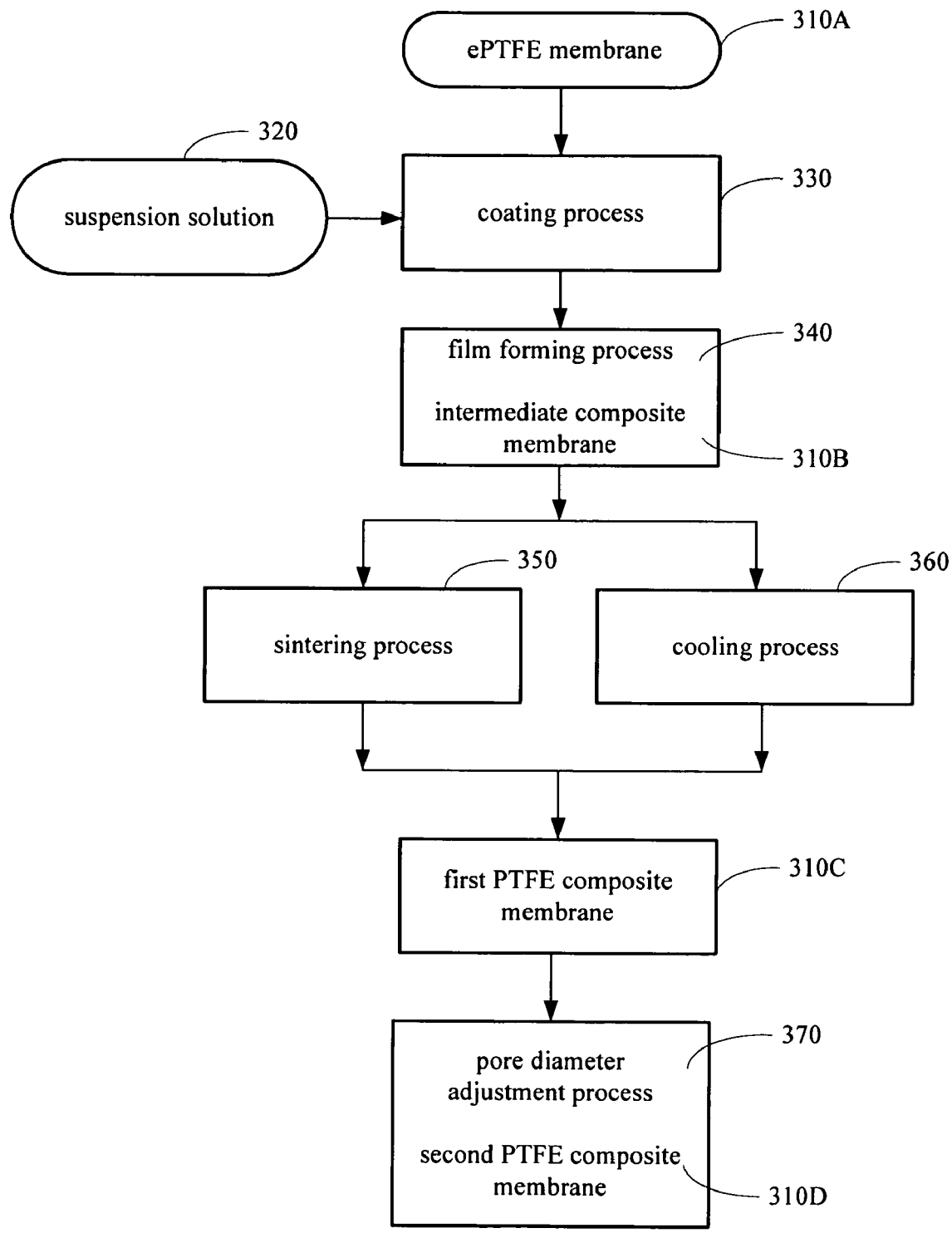
FIG. 3 shows the process flow chart for forming a composite PTFE membrane in the third embodiment of the present invention.

As shown in FIG. 3, the third embodiment of the invention discloses a method for forming a composite PTFE membrane. At first, an ePTFE membrane 310A is provided that has a first surface and a second surface. A suspension solution 320 containing PTFE fine powders is provided and coated on the first surface of the ePTFE membrane 310A by a coating process 330. The coating methods, for instance, include spraying, roller coating, blade coating, dip-coating, spin-coating, etc. The suspension solution 320 containing PTFE fine powders is selected from a group consisting of the following or any combinations of the following: unsintered PTFE fine powders, thermoplastic fluorinated organic polymers, and low molecular weight PTFE. Then, a sintering process 350 is performed on the first surface of the ePTFE membrane 310A and a cooling process 360 is performed on the second surface of the ePTFE membrane 310A to form a sintered porous PTFE membrane on the first surface so as to form a first composite PTFE membrane 310C.

In this embodiment, before the sintering process 350, a preheat process can be performed in heating devices, such as infrared gold image furnaces, Hot Presses, and ovens, etc, so as to have more uniform temperature in the heating device during sintering, wherein the preheat temperature is about 150~250° C. and the preheat time is about 30 seconds~3 minutes. Moreover, after the sintering process 350 along with the cooling process 360 are completed, a pore diameter adjustment process 370 can be performed by adjusting the quenching rate of the first composite PTFE membrane 310C, such as using different quenching temperature and different quenching medium to cool the first composite PTFE membrane 310C, to tailor gaps among the sintered PTFE particles on the first composite PTFE membrane 310C, forming a second composite PTFE membrane 310D. The pore gaps of the porous membrane become smaller as the quenching rate decreases. The quenching media comprises gas and liquid wherein the liquid comprises aqueous-phase solution or oil-phase solution. Additionally, the ePTFE membrane 310A, the sintered porous PTFE membrane, the sintering process 350, and the cooling process 360 have the same selections and conditions as the according matter described in the first embodiment.

In this embodiment, a film forming process 340 can be performed before the sintering process 350, wherein the temperature is below about 50° C. to make the suspension solution 320 form a film on the first surface of the ePTFE membrane 310A, so as to form an intermediate composite membrane 310B. The drying of the suspension solution 320 coated on the expanded PTFE membrane is in an environment with ventilation. The suspension solution 320 further comprises a thickener, such as carboxymethyl-cellulose sodium salt to uniform the film thickness and to smooth the film. The content of the thickener is less than or equal to 5 wt % of the weight of the suspension solution 320. The preferred content of the thickener is less than or equal to 2 wt % of the weight of the suspension solution 320. Another function of the thickener is to increase the viscosity of the suspension solution 320 to a certain level, preventing the PTFE particles that with diameters less than or equal to the pore diameter of the ePTFE membrane 310A from penetrating into the pores of the ePTFE membrane 310A. The PTFE particles thus stay on the surface of the ePTFE membrane 310A to be fused in the following sintering process to form porous membranes. Furthermore, in order to avoid serious shrinkage of the intermediate composite membrane 310B during the sintering process and to improve the film surface smoothness, the intermediate composite membrane 310B is fixed by at least one fixation device. The fixation device is used to anchor the edge of the intermediate composite membrane 310B. Moreover, the fixation device consisting of inactive substances that directly contact with the intermediate composite membrane 310B to avoid its shrinking during sintering. In addition, the inactive substance further comprises ceramics or metals.

In the embodiments, the invention discloses a composite PTFE membrane, formed by coating a suspension solution containing PTFE fine powders on an expanded PTFE membrane, together with a sintering process to fuse the coated PTFE particles to form a porous structure with interconnected channels. Moreover, during the sintering of the PTFE particles coated on one surface of the ePTFE membrane, it is suggested that a cooling process is simultaneously carried out on the other surface, to prevent serious shrinking of the ePTFE membrane and to reduce the regular sintering time via elevating the sintering temperature. With the present invention, composite PTFE membranes can be produced of which the pores are smaller than the ePTFE membranes manufactured by the traditional stretching method. Application of PTFE membranes can therefore be extended, indicating that the present invention has advantages over the traditional method.

To sum up, the present invention discloses a composite PTFE membrane comprising an expanded PTFE membrane as substrate and a sintered porous PTFE membrane on top of it. The porous PTFE membrane on top has porous structure with interconnected channels formed with a sintering process that fuses the PTFE fine powders coated on the ePTFE membrane. Furthermore, the present invention discloses a method for forming the composite PTFE membrane.

Obviously many modifications and variations are possible in light of the above teachings. It is therefore to be understood that within the scope of the appended claims the present invention can be practiced otherwise than as specifically described herein. Although specific embodiments have been illustrated and described herein, it is obvious to those skilled in the art that many modifications of the present invention may be made without departing from what is intended to be limited solely by the appended claims.

What is claimed is:

1. A method for forming a composite PTFE membrane, comprising:
    providing an expanded PTFE membrane having a first surface and a second surface; and,
    providing a suspension solution containing PTFE particles;
    coating said suspension solution on said first surface of said expanded PTFE membrane; and,
    performing a sintering process to fuse said PTFE particles on said first surface simultaneously together with a cooling process via a liquid media on said second surface to form a porous PTFE membrane on said first surface, so as to form a first composite PTFE membrane.

2. The method according to claim 1, wherein the thickness of said expanded PTFE membrane is more than or equal to 10 μm.

3. The method according to claim 1, further comprising a film forming process before performing said sintering process, wherein the temperature of said film forming process is below 50 °C. to make said suspension solution form a film on said first surface of said ePTFE membrane, so as to form an intermediate composite membrane, and the drying of said suspension solution coated on said expanded PTFE membrane is in an environment with ventilation.

4. The method according to claim 3, wherein said suspension solution further comprises a thickener.

5. The method according to claim 4, wherein said thickener comprises carboxymethyl-cellulose sodium salt.

6. The method according to claim 4, wherein the content of said thickener is less than or equal to 5 wt% of the weight of said suspension solution.

7. The method according to claim 4, wherein the content of said thickener is less than or equal to 2 wt% of the weight of said suspension solution.

8. The method according to claim 3, wherein said intermediate composite membrane is fixed by at least one fixation device.

9. The method according to claim 8, wherein said fixation device is used to anchor the edge of said intermediate composite membrane.

10. The method according to claim 8, wherein said fixation device consists of an inactive substance and directly contacts with said intermediate composite membrane.

11. The method according to claim 10, wherein said inactive substance comprises ceramics or metals.

12. The method according to claim 1, wherein the processing temperature of said sintering process ranges from 330° C. to 520° C.

13. The method according to claim 1, wherein the duration of said sintering process is less than or equal to 20 minutes.

14. The method according to claim 1, wherein said processing temperature of said cooling process is less than or equal to 50° C.

15. The method according to claim 1, after said sintering process along with said cooling process are completed, a pore diameter adjustment process is performed by adjusting the quenching rate of said first PTFE composite membrane to adjust the pore diameter of said porous PTFE membrane, so as to form a second composite PTFE membrane.

16. The method according to claim 15, wherein the pore diameter of said porous PTFE membrane becomes smaller as the quenching rate decreases.

* * * * *